Aug. 25, 1925.
H. J. MINDERMANN
1,550,917
THEFT PREVENTING VEHICLE DEVICE
Filed May 7, 1924
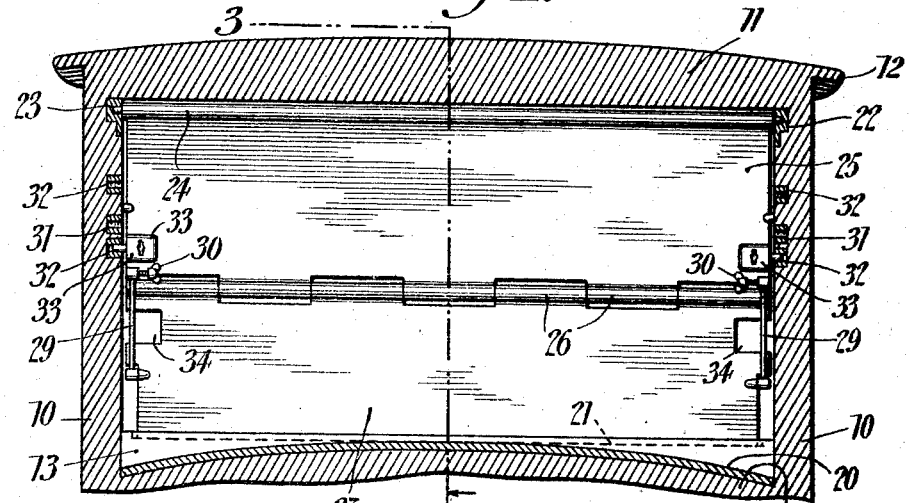
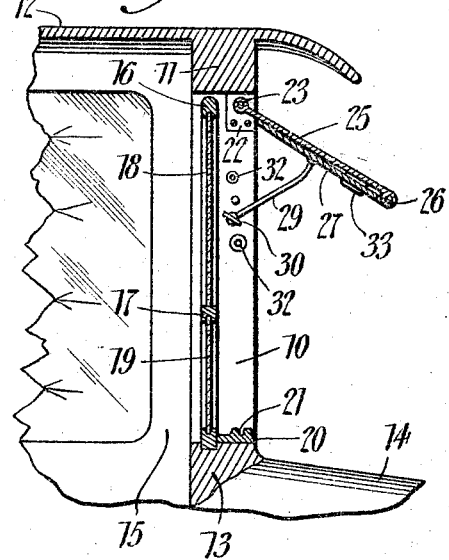
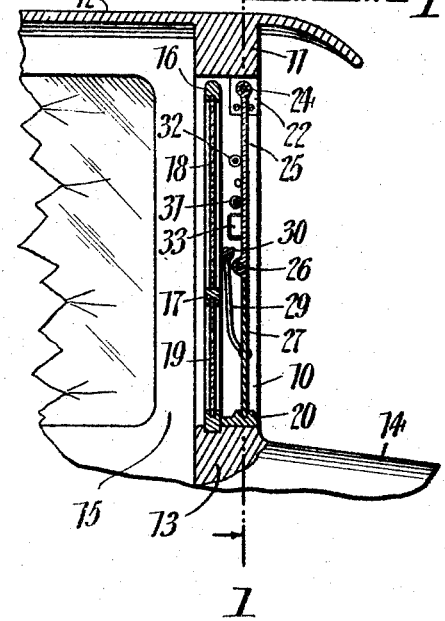
Inventor
Henry J. Mindermann
By his Attorney

FLEXIBLE & PORTABLE.

Patented Aug. 25, 1925.

1,550,917

UNITED STATES PATENT OFFICE.

HENRY J. MINDERMANN, OF WEST HOBOKEN, NEW JERSEY.

THEFT-PREVENTING VEHICLE DEVICE.

Application filed May 7, 1924. Serial No. 711,538.

*To all whom it may concern:*

Be it known that I, HENRY J. MINDERMANN, a citizen of the United States, residing at West Hoboken, in the county of Hudson and State of New Jersey, have invented certain new and useful Improvements in Theft-Preventing Vehicle Devices, of which the following is a specification.

This invention relates to devices designed to prevent the unauthorized use of a vehicle and hence the liability of its loss by theft.

All vehicles of the better grade, such as automobiles, are provided with a transparent panel in their front wall through which the operator of the car is able to see in directing and controlling the advance of the vehicle, so as to avoid collision with moving or stationary objects, such panels being known as windshields.

One of the objects is to provide means for obstructing vision through the windshield by the use of temporary shutters, rendering the car unusable.

Another purpose is to provide a pivotally supported shutter, composed of hinged sections and provided with adjustable support means whereby the shutter may be raised, lowered or extended at an angle and securely locked when in any desired position.

Other features and advantages will hereafter appear.

In the accompanying drawing:—

Figure 1 is a transverse sectional view taken through the upper front portion of a conventional type of car in a plane represented by the line 1—1 of Figure 3.

Figure 2 is a fragmentary longitudinal sectional view taken on the center line of the same and showing the shutter in a partially raised and inclined position.

Figure 3 is a similar sectional view taken on line 3—3 of Figure 1 and showing the shutter extended to completely obscure the view.

In the drawing the numeral 10 designates in general the front corner posts of a car joined at their tops by a rail or beam 11 supporting the roof 12.

The lower ends of the posts connect with a cross-piece 13 adjacently above the plane of the hood 14 and the car side walls 15 connect with the posts in the usual manner.

A wind-shield frame 16, here shown as having a horizontal cross-bar 17 contains glass or like transparent plates 18 and 19, the lower element of the frame resting in a groove in the cross-piece 13.

Adjacently in front of this groove is a strip 20 containing a longitudinal recess 21.

Set in the inner surfaces of the posts 10, at their upper ends are brackets 22 in which are mounted spindles 23 passing through the beaded upper edge 24 of an opaque shutter plate 25.

The lower edge of the shutter plate is engaged by hinges 26 with a lower section 27 of the shutter, the same being so proportioned as to rest in the groove 21 when the shutter plates are fully extended.

Pivotally engaged with the ends of the plate are arms 29 bent to extend inwardly and carrying at their free ends thumb screws 30 adapted to engage in certain of the bushings 31 holding the shutter element in any preferred raised adjustment.

Other similar but plain bushings 32 fixed in the posts are receptive of the bolts of locks 33 fixed near the end edges of the upper plate 25 and easily operable by a key entered direct when the shutter is fully extended or by passing the key through the openings 34 in the plate 27 when the plates are closely folded as shown in Figure 2, at which time the car can be controlled in the usual manner, a clear view being had through the wind-shield.

When the car is parked or temporarily not in use, the screws 30 are retracted, the shutter fully extended and the locks employed to hold them in a closed position, rendering it essentially impossible to use the car, or if it be used in such condition attention is immediately attracted and investigation ensues.

Variations may be resorted to within the scope of the invention and portions of the improvements may be used without others.

Having thus described my invention, what I claim as new and desire to secure by Letters Patent, is:—

The combination with a vehicle having a transparent panel at the front and posts at the ends of said panel, of a sectional opaque shutter having pivotal connections with said posts, the sections of said shutter being hingedly connected, arms pivotally attached to the lower section of said shutter, sockets in said posts, means for adjustably engaging the free ends of said arms to said sockets, and a key operated lock fixed to said shutter, the bolts of said locks being engageable in said sockets.

In witness whereof I have affixed my signature.

HENRY J. MINDERMANN.